Jan. 14, 1936.   J. W. ANDERSON ET AL   2,027,362
WINDSHIELD WIPER
Filed Dec. 9, 1931   2 Sheets-Sheet 2
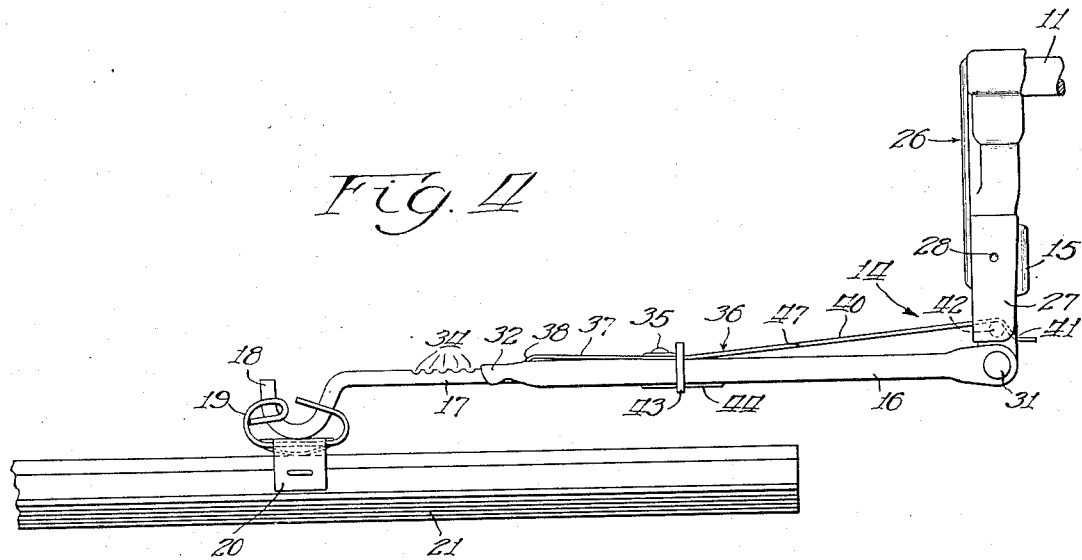
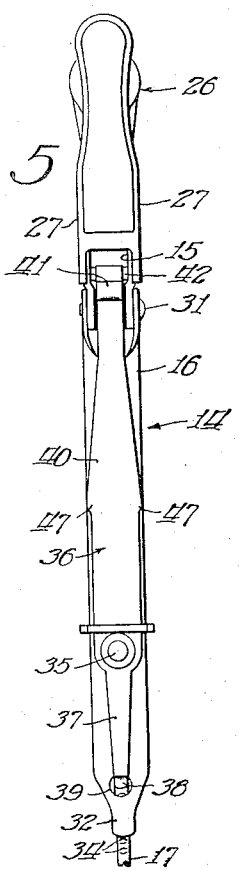
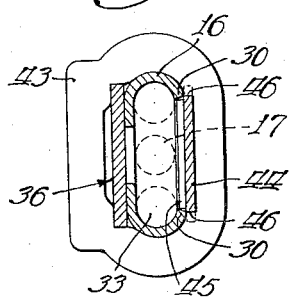
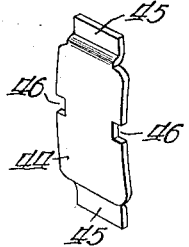
Inventors
John W. Anderson
Theodore J. Smulski
By Hill & Hill  Attys
Witness:
V. Siljander Patented Jan. 14, 1936

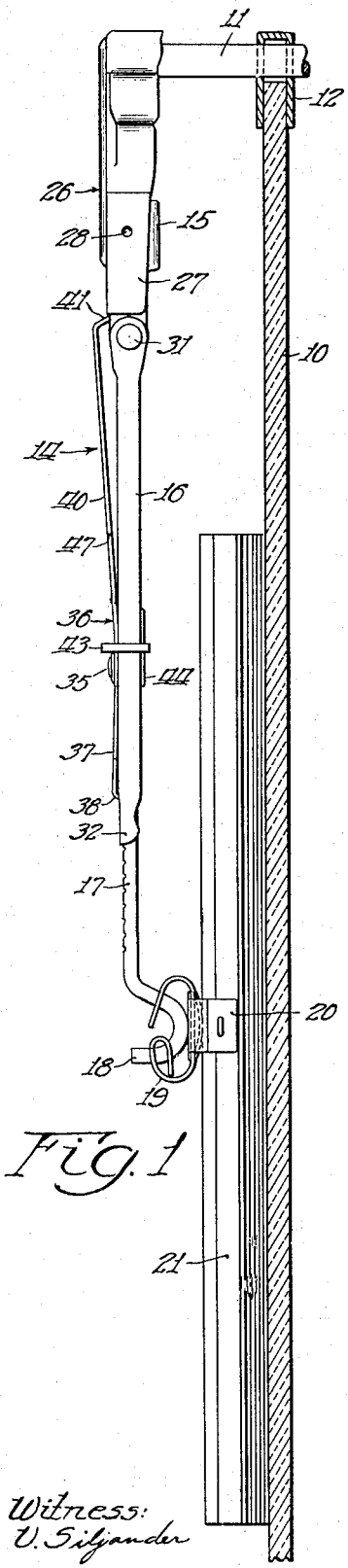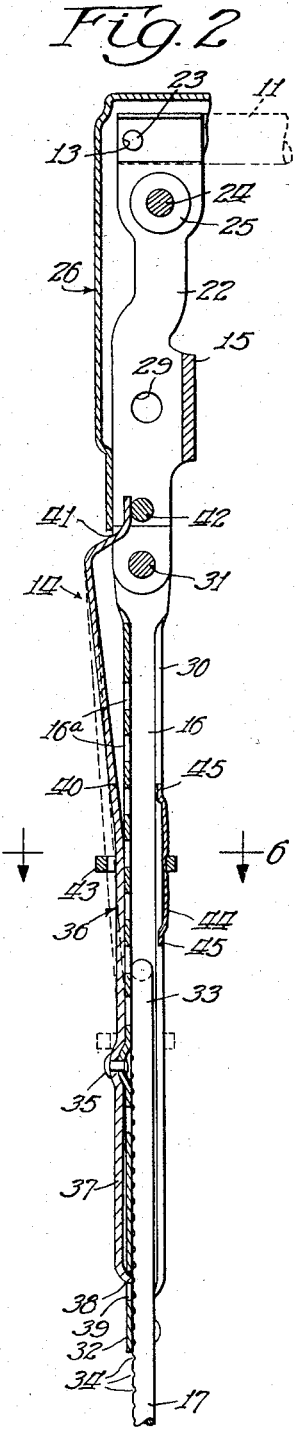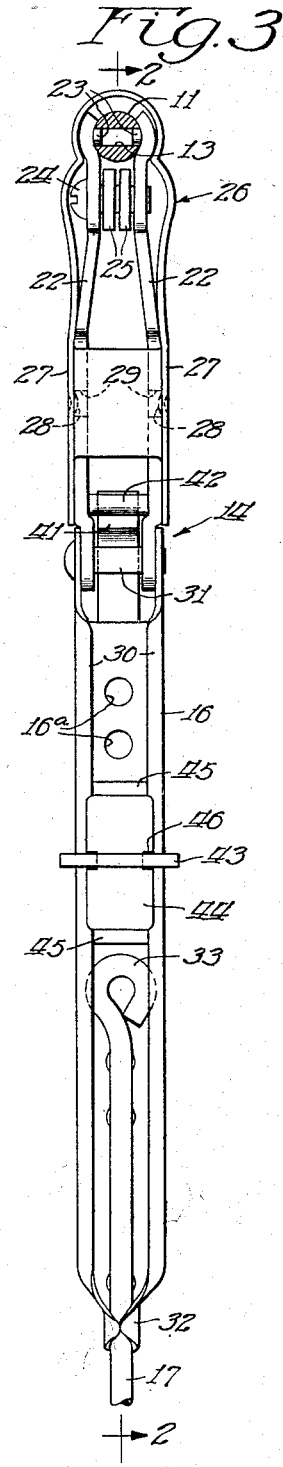

2,027,362

UNITED STATES PATENT OFFICE 2,027,362

WINDSHIELD WIPER

John W. Anderson, Gary, Ind., and Theodore J. Smulski, Lake Zurich, Ill.; said Smulski assignor to The Anderson Company, Gary, Ind., a corporation of Indiana Application December 9, 1931, Serial No. 579,874

13 Claims. (Cl. 15—255)

This invention relates to a windshield wiper, and particularly to the arm thereof by which the wiping element is supported and operatively connected to an actuating member, such as a shaft or other suitable device.

One object of the present invention is to provide a sectional wiper arm which may be readily adjusted to various lengths for positioning the wiping element at various distances from the actuating member, and to provide simple and efficient means for yieldingly maintaining the respective sections of the arm in various positions of adjustment.

Another object of the invention is to provide a wiper arm having resilient means associated therewith for urging the arm and wiping element toward the windshield, and wherein a novel construction and arrangement is provided for varying the tension of said resilient means.

Another object of the invention is to provide a wiper arm strong enough to carry loads encountered in service without breakage of the arm adjacent to the shaft or other actuating member.

Another object of the invention is to provide a wiper arm, which, together with the wiping element, may be swung or moved outwardly away from the windshield, and yieldingly retained in such outward position, thereby providing free and unobstructed access to the surface of the windshield for washing or other manual cleaning.

Another object of the invention is to provide a structure wherein the resilient means for urging the wiper arm toward the windshield serves to yieldingly retain the arm and wiping element in their outward or raised position, and also to yieldingly maintain the respective sections of the arm in their various positions or adjustment.

Another object of the invention is to provide a wiper arm which may be readily applied to and disconnected from its actuating member, and wherein the means for varying the tension of the resilient means associated with the arm may be conveniently and readily adjusted to vary the pressure of the wiping element on the windshield.

A further object of the invention is to provide a structure wherein the means for attaching or securing the wiper arm to its actuating member is retained against accidental displacement, and possible loss of the arm and its associated parts.

A still further object of the invention is to improve devices of the character described in sundry details hereinafter referred to and particularly pointed out in the appended claims.

One embodiment of the present invention is shown for illustrative purposes in the accompanying drawings, in which Fig. 1 is a side view of our improved wiper arm illustrating its application to a wiping element and actuating member operatively related to a windshield;

Fig. 2 is an enlarged longitudinal sectional elevation of the improved arm shown in Fig. 1, and taken substantially as indicated by the line 2—2 of Fig. 3;

Fig. 3 is a rear elevational view of the structure shown in Figs. 1 and 2 taken as viewed from the right side thereof;

Fig. 4 is a side view of the improved wiper arm illustrating the manner of yieldingly retaining a portion of the arm and wiping element in raised position away from the windshield to facilitate washing or manual cleaning thereof;

Fig. 5 is a front view of the improved arm as viewed from the left side of Fig. 1;

Fig. 6 is an enlarged transverse sectional view taken substantially as indicated by the line 6—6 of Fig. 2; and Fig. 7 is an enlarged perspective view of a portion of the spring tensioning device operatively related to the arm.

In the drawings, 10 designates a windshield having a wiper arm actuating member 11 shown, in the present instance, as a shaft rotatably mounted in a frame 12 of the windshield, and provided, in the present instance, with a transversely extending aperture or recess 13 formed preferably adjacent the outer end thereof.

My improved wiper arm, indicated as a whole by the numeral 14, comprises an inner section 15, an intermediate section 16 pivotally connected to the inner section, and an outer section 17 slidably mounted with respect to the intermediate section, and having its extreme outer or lower end portion provided with a hook 18 adapted to engage a connector 19 on which is mounted a clip 20 adapted to receive a windshield wiper element or blade 21 positioned, and adapted for engagement with the surface of the windshield 10.

The inner section 15 comprises, preferably, an integral structure having side portions 22 separated at their upper ends in a manner to straddle and engage opposite sides of the actuating member 11 and provided on their inner sides with inwardly extending studs 23 adapted to engage opposite ends of the aperture 13 in a manner to prevent relative angular movement of the inner section 15 and the actuating member 11. Extending loosely through one of the side portions 22 and screw-threaded into the other side portion of the inner section 15 is a clamping bolt 24 for drawing the side portions 22 snugly against opposite sides of the actuating member, a plurality of washers 25 of suitable thickness being positioned on the bolt 24 between the side portions 22 for suitably spacing the side portions with respect to each other.

For covering the connection between the inner section 15 of the arm 14 and the actuating member 11, a shield 26 is provided and adapted to cover the head of the bolt 24 in a manner to prevent its accidental displacement from the side portions 22 of the inner section 15, the shield 26 having resilient side portions 27 provided with inwardly extending projections 28 adapted to engage apertures 29 formed in the side portions 22 for yieldingly maintaining the shield in position with respect to the inner section 15 and actuating member 11.

By connecting the inner section 15 to the actuating member 11 in the manner above described, it will be observed that the inwardly projecting studs 23 of the inner section 15 being positioned in opposite ends of the aperture 13, and the side portions 22 clamped to opposite sides of the shaft 11, divide the operating load at these points of engagement with the shaft 11 between two cross sectional areas approximately equal to the cross sectional area of the aperture and the clamping engagement between the side portions 22 and the actuating member, thereby obtaining greater durability than is ordinarily obtained by a structure wherein the entire load is carried by single cross sectional area of the driven member or arm, as is the case in various present devices and which are subject to frequent breakage at a point near the connection of the arm and operating shaft.

The intermediate section 16 comprises, in the present instance, a channel-like member of laterally elongated U-shaped cross section having inwardly extending edge portions 30 spaced from each other to form an open side of the channel, the upper end of the intermediate section 16 being bifurcated and pivotally connected to the lower end of the inner section 15 by means of a bolt or trunnion 31, while the sides of the lower end of the section 16 are folded inwardly toward each other to provide a sleeve 32 adapted to slidably receive the intermediate portion of the outer section 17, the upper or inner end of which is provided with a laterally extending portion shown, in the present instance, as a loop 33 slidably positioned in the laterally elongated channel portion of the intermediate section 16.

For maintaining the outer section 17 in various positions of longitudinal adjustment with respect to the intermediate section 16, the section 17 is provided along one of its sides with a plurality of notches 34, and rigidly secured to the intermediate section 16 by means of a rivet 35 is a resilient member shown, in the present instance, as a leaf spring and indicated as a whole by the numeral 36, the lower end portion 37 of the spring being provided with a laterally extending portion 38 adapted to extend through an aperture 39 formed in the intermediate section 16 in a manner to engage the notches 34 of the outer section 17 and yieldingly retain the outer section in various positions of longitudinal adjustment with respect to the intermediate section 16. It will be observed by such an arrangement that the outer section 17 and wiping element 21 carried thereby may be readily adjusted with respect to the inner and intermediate sections of the arm and the actuating shaft 11 in a manner to lengthen or shorten the arm structure to position the wiping element nearer to or further from the actuating member 11.

For urging the intermediate and outer sections 16 and 17, respectively, toward the windshield in a manner to provide suitable contact between the wiping element 21 and the surface of the windshield, the upper portion 40 of the spring 36 is provided adjacent its free end with an offset portion or hook 41, the outer end of which is adapted to engage a contact element 42 mounted adjacent the lower portion of the inner section 15 of the arm at a point removed from the pivotal connection between the inner and outer sections 15 and 16, respectively. It will be observed by such an arrangement that with the portion 40 of the spring 36 being under tension, the intermediate section 16 and outer section 17 carrying the wiper element 21 are urged toward the windshield in a manner to exert a pressure of the wiping element thereon to provide an efficient wiping contact.

To protect the present structure against an accumulation of snow or the like between the spring 36 and adjacent face of the intermediate section 16, the section 16 is provided with a plurality of apertures or vents 16a through which the snow may pass, and thus avoid filling the space between the spring 36 and intermediate section 16 of the arm.

For varying the tension of the portion 40 of the spring 36 in a manner to vary the pressure exerted by the wiping element 21 on the surface of the windshield, a yoke 43 is shown, in the present instance, as surrounding the portion 40 of the spring and the adjacent portion of the intermediate section 16 as clearly shown in Fig. 6, the yoke 43 being slidably mounted with respect to the portion 40 and intermediate section, and adapted to be retained in suitable frictional engagement with the portion 40 by means of a spring element 44 positioned between one side of the yoke 43 and the adjacent side of the intermediate section 16, the spring element 44 being provided adjacent its ends with inwardly extending offset portions 45 adapted to enter the open side of the U-shaped channel between the edges 30 thereof, the element 44 being provided also with notches 46 adapted to receive portions of the yoke 43 in a manner to retain the yoke and spring element in relatively fixed position with respect to each other.

It will be observed from the foregoing description that by moving the yoke upwardly, the effective part of the spring portion 40 is shortened, thereby stiffening the spring and exerting a greater pressure of the wiping element 21 on the windshield 10, and that by reason of the frictional contact between the yoke 43 and portion 40, exerted by the spring element 44, the yoke will be retained in adjusted position for maintaining the desired pressure. The portion 40, in the present instance, is provided with a pair of shoulders or stops 47 (Fig. 5) for limiting the upward movement of the yoke with respect to the spring portion 40 and intermediate section 16.

By reference to Fig. 4, it will be observed that the intermediate section 16, outer section 17 and wiping element 21 attached thereto may be moved or swung outwardly and upwardly about the pivotal connection or trunnion 31 away from the windshield, and yieldingly retained in such position by engagement of the offset or hook portion 41 of the spring 36 engaging over the contact element 42 as shown in Fig. 4, thereby providing free and unobstructed access to the surface of the windshield for manual cleaning or other purposes.

It will be observed from the foregoing description that the present invention provides a sectional wiper arm which may be readily adjusted to various lengths and yieldingly retained in the various positions of longitudinal adjustment. The present invention also provides a structure having pressure means whereby the wiping element is yieldingly urged toward the windshield, and wherein the tension of the pressure means may be readily varied, such pressure means of the present arrangement being employed also for yieldingly maintaining a portion of the wiper arm and the wiping element in raised position away from the windshield.

Obviously, the present invention is not limited to the precise construction and arrangement shown and described, as the same may be variously modified without departing from the spirit and scope of the invention as set forth in the claims. Moreover, all the features of the invention need not be used conjointly, as the same may be used to advantage in variously different combinations and sub-combinations within the scope of the appended claims.

Having thus described our invention, what we claim as new and desire to cover by Letters Patent is:

1. In a device of the class described, the combination with an actuating member operatively related to a windshield, of an arm carried by said member and pivotally mounted with respect thereto, resilient means mounted on said arm and having a free end engaging a relatively fixed portion of said actuating member for yieldingly urging the arm toward the windshield and having an offset hook-like portion adjacent said free end engageable with said fixed portion of the actuating member for maintaining the arm in an adjusted position away from the windshield, and means slidably mounted on said arm and engageable with various portions of said resilient means for varying the tension thereof.

2. In a device of the class described, the combination with an actuating member operatively related to a windshield, of an arm mounted on said member and comprising a plurality of sections, certain of said sections being relatively movable angularly with respect to each other and certain of the sections being relatively movable longitudinally of each other, a resilient member mounted on one of said sections and engaging the other sections for yieldingly maintaining the relatively angularly movable sections in various positions of angular adjustment with respect to each other, and for yieldingly maintaining the relatively longitudinally movable sections in various positions of longitudinal adjustment with respect to each other, and means engaging said resilient member and one of said sections for varying the tension of said resilient member.

3. In a device of the class described, the combination with an actuating member operatively related to a windshield, of an arm comprising an inner section rigidly connected to said member, an intermediate section pivotally mounted on said inner section for movement in a plane substantially perpendicular to the windshield, and an outer section slidably mounted on said intermediate section, a flat spring mounted on and secured to one side of the intermediate section and extending from its securing means into engagement with the others of said sections for yieldingly maintaining the respective sections in various positions of relative adjustment with respect to each other, said intermediate section having a plurality of vents formed therethrough adjacent said spring to prevent accumulation of matter between said intermediate section and said spring, and means slidably mounted on one of said sections and engageable with said spring for varying the tension thereof.

4. In a device of the class described, the combination with an actuating member operatively related to a windshield, of an arm comprising a plurality of sections, two of said sections being pivotally mounted with respect to each other for movement in a plane substantially perpendicular to the windshield, and another of the sections being mounted on and longitudinally movable with respect to one of said pivoted sections, one end section of the arm being rigidly connected to said actuating member, and resilient means carried by one of the sections and engaging the other sections for maintaining the pivotally connected sections in various positions of angular adjustment with respect to each other and for maintaining the relatively longitudinally movable sections in various positions of longitudinal adjustment with respect to each other.

5. In a device of the class described, the combination with an actuating member operatively related to a windshield, of an arm comprising a plurality of sections, two of said sections being pivotally mounted with respect to each other for movement in a plane substantially perpendicular to the windshield and another of the sections being mounted on and longitudinally movable with respect to one of said pivoted sections, one end section of the arm being rigidly connected to said actuating member, resilient means carried by one of the sections and engaging the other sections for yieldingly maintaining the pivotally connected sections in various positions of angular adjustment with respect to each other and for yieldingly maintaining the relatively longitudinally movable sections in various positions of longitudinal adjustment with respect to each other, and means engaging one of the sections and the resilient means for varying the tension of said resilient means.

6. In a device of the class described, the combination with an actuating member operatively related to a windshield, of an arm comprising a plurality of sections, two of said sections being pivotally mounted with respect to each other for movement in a plane substantially perpendicular to the windshield and another of the sections being mounted on and longitudinally movable with respect to one of said pivoted sections, one end section of the arm being rigidly connected to said actuating member, resilient means mounted on one of said sections and engaging the other sections for yieldingly maintaining the pivotally mounted sections in various positions of angular adjustment with respect to each other and for yieldingly maintaining the relatively longitudinally movable sections in various positions of longitudinal adjustment with respect to each other, and means slidably mounted on said one of said sections and engaging the resilient means for varying the tension of said resilient means.

7. In a device of the class described, the combination with an actuating member operatively related to a windshield, of an arm comprising a plurality of sections, two of said sections being pivotally mounted with respect to each other for movement in a plane substantially perpendicular to the windshield and another of the sections being mounted on and longitudinally movable with respect to one of said pivoted sections, one end section of the arm being rigidly connected to said actuating member, a flat spring rigidly mounted on one of said sections and engaging the other sections for yieldingly maintaining the pivotally mounted sections in various positions of angular adjustment with respect to each other and for yieldingly maintaining the relatively longitudinally movable sections in various positions of longitudinal adjustment with respect to each other, and means slidably mounted on said one of said sections and engaging said spring for varying the tension thereof.

8. In a device of the class described, the combination with an actuating member operatively related to a windshield, of an arm mounted on said member and comprising an inner section rigidly secured to the actuating member, an intermediate section pivotally mounted with respect to said inner section for movement in a plane substantially perpendicular to the windshield, and an outer section slidably mounted with respect to said intermediate section, and a spring secured to said intermediate section and extending into engagement with and reacting against a portion of said inner section for urging the outer section toward the windshield, said spring having a portion engageable with said portion of the inner section when the outer section is in raised position away from the windshield for retaining the outer section in said position, the said spring extending into engagement with said outer section for retaining the outer section in various adjusted positions longitudinally with respect to said intermediate section.

9. In a device of the class described, the combination with an actuating member operatively related to a windshield, of an arm mounted on said member and comprising an inner section rigidly secured to the actuating member, an intermediate section pivotally mounted with respect to said inner section for movement in a plane substantially perpendicular to the windshield, and an outer section having a plurality of notches formed therein and slidably mounted with respect to said intermediate section, and a spring secured to said intermediate section and extending into engagement with and reacting against a portion of said inner section at a point removed from its pivotal connection with the intermediate section for urging the outer section toward the windshield, said spring having an offset portion engageable with said portion of the inner section when the outer section is in raised position away from the windshield for retaining the outer section in said position, the said spring extending into engagement with the notches formed in said outer section for retaining the outer section in various positions of longitudinal adjustment with respect to said intermediate section.

10. In a device of the class described, the combination with an actuating member operatively related to a windshield, of an arm mounted on said member and comprising an inner section rigidly secured to the actuating member and having a contact element mounted thereon, an intermediate section pivotally mounted with respect to said inner section for movement in a plane substantially perpendicular to the windshield at a point removed from said contact element, and an outer section having a plurality of notches formed therein and slidably mounted with respect to said intermediate section, a leaf spring secured intermediate its ends to said intermediate section and having its upper end portion extending into engagement with and reacting against said contact element for yieldingly urging the outer section toward the windshield, the said upper end portion of the spring being provided with a hook engageable with said contact element when the intermediate section and outer sections are in raised position away from the windshield for yieldingly retaining the intermediate and outer sections in said position, the opposite end portion of said spring being extended into engagement with the notches formed in said outer section for yieldingly retaining the outer section in various positions of longitudinal adjustment with respect to said intermediate section, and means slidably mounted on said intermediate section and engaging said spring for varying the tension of the portion of the spring engaging said contact element.

11. In a device of the class described, the combination with an actuating member operatively related to a windshield, of an arm mounted on said member and comprising an inner section, an intermediate section and an outer section, said inner section having a contact element mounted thereon and having one of its end portions rigidly secured to said actuating member, said intermediate section comprising a member of laterally elongated U-shaped cross section having one of its ends pivotally mounted on said inner section for movement in a plane substantially perpendicular to the windshield and at a point removed from said contact element, the opposite end of said intermediate section being folded in to form a supporting sleeve, said outer section having a plurality of longitudinally spaced notches formed therein and having a portion intermediate its ends slidably mounted in said supporting sleeve, one end of the outer section being extended laterally and slidably mounted in the U-shaped portion of the intermediate section, a leaf spring secured intermediate its end portions to said intermediate section and extended to engage at one of its end portions the said contact element for yieldingly urging said intermediate and outer sections toward the windshield, the said one end portion of the spring being provided with a hook engageable with said contact element when the intermediate and outer sections are in raised position away from the windshield for yieldingly retaining the intermediate and outer sections in said position, the opposite end portion of said spring being extended laterally from the body thereof and into engagement with the notches formed in said outer section for yieldingly retaining the outer section in various positions of longitudinal adjustment with respect to said intermediate section, a yoke slidably mounted on and adapted to surround said intermediate section and leaf spring adjacent the portion thereof extended toward said contact element, a yielding element engaging said yoke and intermediate section for retaining the yoke in frictional engagement with said leaf spring, and means formed on said leaf spring for limiting the movement of the yoke longitudinally of the leaf spring and intermediate section.

12. In a device of the class described, the combination with an actuating member operatively related to a windshield, of an arm comprising a plurality of sections, two of said sections being pivotally mounted with respect to each other for movement in a plane substantially perpendicular to the windshield, and another of the sections being mounted on and longitudinally movable with respect to one of said pivoted sections, one end section of the arm being rigidly connected to said actuating member, and resilient means carried by one of the sections and cooperating with the other sections for maintaining the pivotally connected sections in various positions of angular adjustment with respect to each other and for maintaining the relatively longitudinally movable sections in various positions of longitudinal adjustment with respect to each other.

13. In a device of the class described, the combination with an actuating member operatively related to a windshield, of an arm mounted on said member and comprising an inner section rigidly secured to the actuating member and having a substantially cylindrical contact element mounted thereon, an intermediate section pivotally mounted with respect to said inner section for movement in a plane substantially perpendicular to the windshield, and an outer section slidably mounted with respect to said intermediate section, and a spring secured to said intermediate section and extending into engagement with and reacting against said contact element on the inner section for urging the outer section toward the windshield, said spring having a portion engageable with said contact element of the inner section when the outer section is in raised position away from the windshield for retaining the outer section in said position, the said spring extending into engagement with said outer section for retaining the outer section in various adjusted positions longitudinally with respect to said intermediate section.

JOHN W. ANDERSON.
THEODORE J. SMULSKI.